Patented Dec. 23, 1930

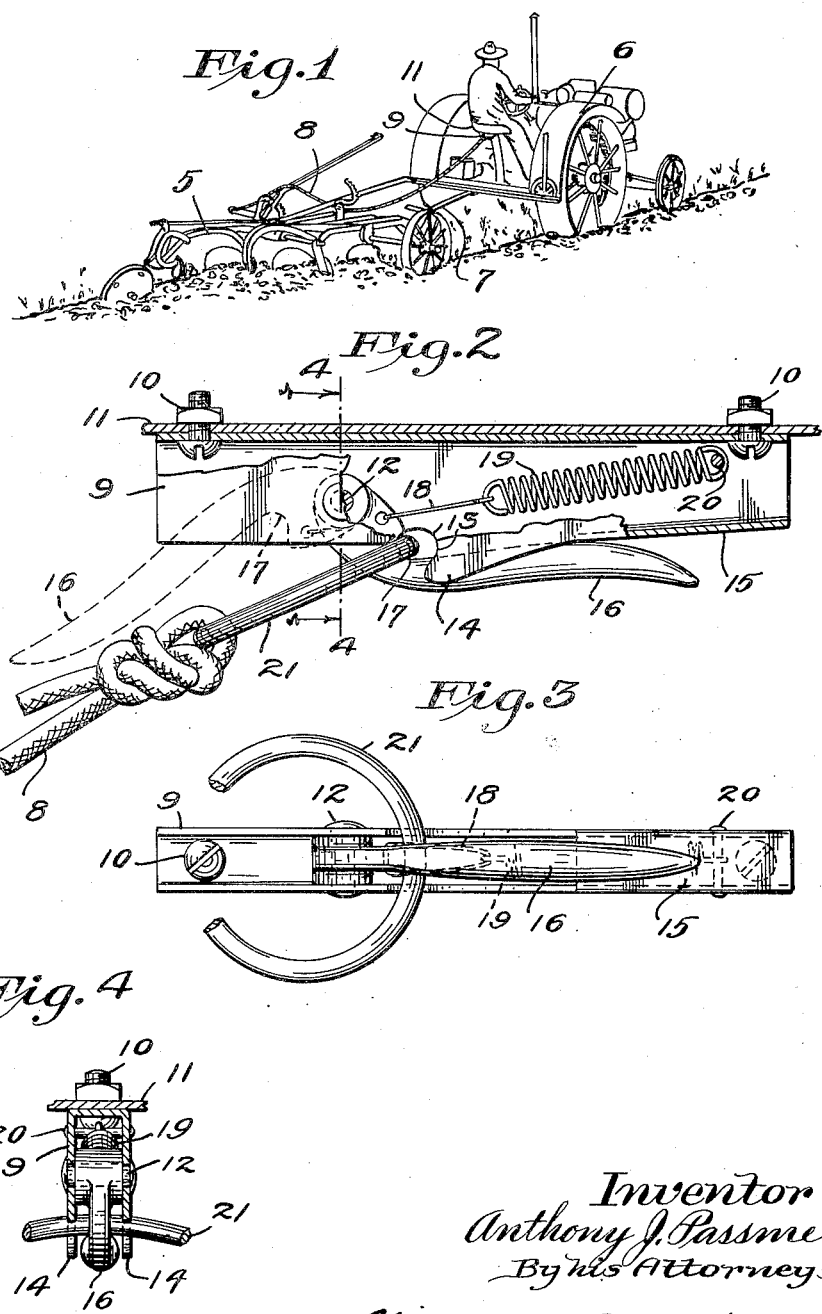

1,786,314

UNITED STATES PATENT OFFICE

ANTHONY J. PASSMEL, OF VALLEY CITY, NORTH DAKOTA

TRIP-ROPE HOLDER

Application filed March 10, 1928. Serial No. 260,598.

It is the object of this invention to provide a novel and improved trip rope holder, for releasably securing the trip rope of a tractor plow, or similar farm implement drawn by a tractor, to the tractor.

To this end, the invention consists in the novel parts and novel combinations of parts hereinafter defined in the claims and described in the following specification, made in connection with the accompanying drawings, wherein like reference characters refer to the same or similar parts throughout the various views, and, in which Fig. 1 is a perspective view illustrating a tractor and tractor plow drawn thereby, and showing the trip rope of the tractor plow connected to the tractor by the holder of the present invention;

Fig. 2 is a view in side elevation on an enlarged scale illustrating the holder, certain of the parts being broken away and shown in section, and certain of the parts being shown in one position in full lines and in another position in dotted lines;

Fig. 3 is a view in edge elevation of the holder, and

Fig. 4 is a vertical section taken on the line 4—4 of Fig. 2 as is indicated by the arrows.

Referring to the drawings, a tractor plow is illustrated, connected to a tractor 6 as by means of a releasable hitch 7. The tractor plow 5 is provided with the usual trip rope 8, whereby the plow can be actuated to either raise the frame of the plow and the shares carried thereby relative to the wheels of the plow from the ground, to carry the shares out of the ground, or the trip rope can be actuated to lower the frame and shares carried thereby from raised non-ground engaging position relative to the wheels to carry the shares into the ground. The mechanism for raising and lowering the shares of the plow relative to the ground is of any well known type and need not be described here. It is sufficient to state that when the tractor plow is being drawn by the tractor and is plowing ground, that the shares can be raised from the ground by pulling the trip rope 8 once, whereupon the shares can be again lowered into the ground by pulling the trip rope 8 a second time. The trip rope 8 runs forwardly to the tractor and is now commonly carried loosely in the hand of the operator of the tractor or is sat on by the operator, so that the rope will be in convenient position for use. When the rope is thus loosely carried, the operator often loses control of the same and must stop his plowing operations and get off the tractor to recover the rope. It thus becomes desirable to provide a holder for securing the forward end of the trip rope 8 to the tractor. As releasable hitches are now commonly used for connecting the tractor plow to the tractor, the forward end of the trip rope 8, if tied, or otherwise fixedly secured to the tractor, would break when the hitch released the plow from the tractor. It thus becomes desirable to provide a releasable holder for securing the forward end of the trip rope to the tractor adjacent the normal position of the operator thereof. Although various holders have been provided for this purpose, these holders are either quite complicated in structure or are so formed that the trip rope cannot be conveniently and quickly engaged therewith.

In accordance with the present invention, a short narrow channel shaped casing 9 is provided which may be secured as by bolts 10 projecting through its base to the seat 11, or to some other portion of a tractor within easy reach of an operator thereof sitting upon the seat 11. A pivot 12 is mounted in the sides of the casing 9 adjacent the rear end thereof and forwardly of the pivot 12, the outer edges of the sides of the casing are provided with notches 13. Immediately forwardly from and projecting outwardly and slightly rearwardly from the notches, claws 14 are formed on the edges of the sides of the casing and forwardly of the claws a stop portion 15 projects between the outer edges of the casing and is formed integral therewith or secured thereto. A hook 16 is provided at one end with a small hub portion which is mounted on the pivot 12 to permit swinging movement of the hook. In normal position, the hook will first project slightly outwardly and forwardly from the pivot 12, whereupon the hook will bend toward the outer end of the casing and strike the stop 15. The outer or free end of the hook will project outwardly a short distance from the stop 15 and will be bluntly pointed. Adjacent its pivoted end, the hook 16 is provided with a notch 17 which is adapted to cooperate with the notches 13 in the arms of the casing rearwardly of the claws 14 to form a ring holding recess. Between the hub at the pivoted end of the hook 16 and the notch 17, a small aperture is bored through the hook and a short link 18 is secured at one end through the aperture to the hook, the other end of the link being secured to the rear end of a coiled tension spring 19 which, in turn, is secured at its forward end to a small pin 20 extending between and secured to the sides of the casing 9 adjacent their forward ends. A ring 21 is secured to the forward end of the trip rope 8.

To secure the trip rope to the tractor, the ring 21 need only be placed between the forward pointed end of the hook 16 and the stop 15 and pulled slightly rearwardly, inasmuch as the forward end of the hook will project outwardly far enough from the casing 9 to catch the ring. The hook 16 will then guide the ring rearwardly to be caught by the notch 17 in the recess formed by the notch 17 and the notches 13 immediately rearwardly of the claws 14. The spring 19 and link 18 will act to normally hold the hook in forwardly projecting position against the stop 15, so that as the link is run rearwardly on the hook, the free end of the hook will swing on pivot 12 slightly rearwardly to allow the ring to pass rearwardly beyond the claws 14, whereupon the spring 19 will again force the hook against the stop 15. The trip rope will thus be held in convenient position for actuation by the operator of the tractor. If, during the plowing operations, the tractor plow 5 should become released from the tractor 6, as by release of the automatic coupling 7, the trip rope will be pulled rearwardly from the tractor, thereby causing the hook 16 to swing from forward position, as illustrated in full lines Fig. 2, to the position illustrated in dotted lines Fig. 2, to release the ring 21 from the hook.

It will be seen that a very simple and efficient trip rope holder is provided, wherein the trip rope can be quickly and easily secured and which will hold the trip rope under normal conditions, but will permit release of the same as connection between the plow and the tractor is broken. It will, of course, be understood that the holder may be used for securing the trip rope on any type of farm implement drawn by a tractor. Various changes may be made in the form, details, arrangement and proportions of the parts without departing from the scope of the present invention.

What is claimed is:

1. A device for releasably securing a trip rope of a tractor plow or similar farm implement to a tractor, comprising a bracket adapted to be secured to a tractor, a hook pivoted at one end in said bracket and having a bracket engaging portion adjacent but spaced from its free end and adapted to normally bear against said bracket and also having an annulus guiding portion at its extreme free end bent outwardly from said bracket engaging portion to permit an annulus to be slipped over the free end of the hook and guided between the hook and the bracket backwardly toward the pivoted end of the hook beyond said bracket engaging portion, resilient means urging and normally holding the bracket engaging portion of said hook against said bracket, and an annulus adapted to be secured to a trip rope and to be engaged with said hook, said hook and bracket having co-operating notched and shouldered portions adjacent the pivot point of said hook and between which said annulus is adapted to be guided when carried backwardly on said hook between said hook and bracket, said co-operating notched and shouldered portions acting to prevent the release of said annulus from said hook when said annulus is pulled in the general direction toward which said hook normally extends.

2. A device for releasably securing a trip rope of a tractor plow or similar farm implement to a tractor, comprising a bracket adapted to be secured to a tractor, a hook pivoted at one end in said bracket and normally projecting forwardly so that a portion of the hook strikes said bracket, a spring urging said hook into forwardly projecting position and an annulus adapted to be secured to a trip rope and to be engaged over said hook between said hook and bracket, said hook and bracket having co-operating notched and shouldered portions between which said annulus is adapted to be guided when carried rearwardly on said hook between said hook and bracket, said co-operating notched and shouldered portions acting to prevent the release of said annulus from said hook when said annulus is pulled in the general direction toward which said hook extends.

In testimony whereof I affix my signature.

ANTHONY J. PASSMEL.